United States Patent [19]

Liu et al.

[11] 4,053,437

[45] Oct. 11, 1977

[54] POLYOLEFIN CATALYST AND METHOD FOR ITS PREPARATION

[75] Inventors: Joseph Liu, Hong Kong; Howard L. Grimmett, Lincolnshire, Ill.; Yu-Tang Hwang, Clinton, Iowa

[73] Assignee: Chemplex Company, Rolling Meadows, Ill.

[21] Appl. No.: 664,030

[22] Filed: Mar. 4, 1976

[51] Int. Cl.$^2$ .................... B01J 21/04; B01J 21/08; B01J 23/26

[52] U.S. Cl. .................................. 252/458; 252/465; 252/468; 252/469; 526/90; 526/96

[58] Field of Search ............... 252/458, 465, 468, 469; 526/106, 90, 96

[56] References Cited

U.S. PATENT DOCUMENTS

| | | | |
|---|---|---|---|
| 2,846,425 | 8/1958 | Hogan et al. | 526/106 |
| 2,951,816 | 9/1960 | Hogan et al. | 252/465 X |
| 3,349,067 | 10/1967 | Hill | 526/106 |
| 3,541,072 | 11/1970 | Witt et al. | 252/458 X |

Primary Examiner—W. J. Shine

Attorney, Agent, or Firm—Wegner, Stellman, McCord, Wiles & Wood

[57] ABSTRACT

A new catalyst and a method of polymerizing olefins in which the catalyst is prepared by forming a mixture by dispersing on a finely divided, difficult to reduce, inorganic support of the class consisting of silica, alumina, thoria, zirconia, titania, magnesia and mixtures or composites thereof, an organic chromium compound pyrolytically decomposable in the substantial absence of oxygen to deposit a catalytically active residue along with a carbon residue as a contaminant on the support, then activating the mixture by subjecting the mixture to non-oxidative pyrolysis to and at a temperature within the range of about 600-2000° F., thereby depositing on the support the chromium-bearing residue and carbon residue as a by-product from the pyrolytic decomposition of the organic chromium compound, and subjecting the activated catalyst after this activating to heat and an oxidizing gas such as air, oxygen, carbon dioxide, nitrous oxide, and the like, to burn off a substantial amount of the carbon residue and to modify and improve the characteristics of the activated catalyst.

40 Claims, No Drawings

POLYOLEFIN CATALYST AND METHOD FOR ITS PREPARATION

CROSS-REFERENCE TO RELATED APPLICATION

This invention in one embodiment is related to the assignee's Hwang et al prior application Ser. No. 478,879, filed June 13, 1974, now U.S. Pat. No. 3,953,413 issued Apr. 27, 1976.

BACKGROUND OF THE INVENTION

The new and improved catalysts of this invention are prepared by depositing on a finely divided and difficult to reduce inorganic oxide selected from silica, alumina, thoria, zirconia, titania, magnesia and/or mixtures thereof an organic chromium compound and then activating the resulting mixture in a non-oxidizing inert or reducing atmosphere at elevated temperatures up to about 2000° C. followed by subjecting the activated catalyst to an oxidizing gas to burn off the carbon residue and to modify or improve the characteristics of the activated catalyst. This invention is also effective in improving the performance of such catalysts wherein the support is first chemically modified with metallic elements including zirconium, titanium and others. It has been found experimentally that a black color formed on the catalyst during activation is due to carbon deposits which are presumed to result from the decomposition of the organic chromium compound during the non-oxidative pyrolysis step. The carbon deposits are substantially removed by burning in an oxidizing gas and the resulting catalysts give much improved performance in 1-olefin polymerization. Notably and significantly improved are catalyst activity, solid polymer color of polymers produced with the new catalyst, and various other desirable polymer physical properties such as melt index, shear response, and melt elasticity.

SUMMARY OF THE INVENTION

The organic chromium compounds used to prepare the catalysts which are the subject of this invention can be any of those that provide an olefin polymerization catalyst when mixed with a support as defined herein and subjected to non-oxidative pyrolysis. One of the types of organic chromium compounds that fall within this description are the chromium chelates of the above Hwang et al Pat. No. 3,953,413. The chelates are derived from one or more beta-dicarbonyl compounds that may be either acyclic or cyclic, the chelates being essentially of the formula of the class consisting of

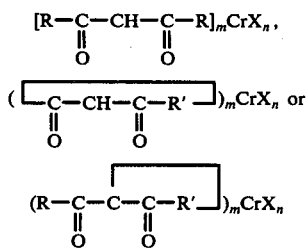

wherein R is individually selected from hydrogen, alkyl, alkenyl, aryl, cycloalkyl and cycloalkenyl radicals and combinations of these radicals with each R containing 0–20 carbon atoms and a corresponding valence-satisfying number of hydrogen atoms, R' is selected from alkylene, alkenylene, arylene, cycloalkylene and cycloalkenylene radicals and combinations of these bivalent radicals with R' containing 1–20 carbon atoms and a corresponding valence-satisfying number of hydrogen atoms, $m$ is a whole number of 1 to 3, $n$ is a whole number of 0 to 2 and $m$ plus $n$ is 2 or 3 and X is an inorganic or organic negative group (relative to chromium) such as halide, alkyl, alkoxy, and the like. Typical compounds are chromium acetylacetonate, chromium benzoylacetonate, chromium 5,5-dimethyl-1,3-cyclohexanedionate, chromium 2-acetylcyclohexanonate, and the like.

A second group of organic chromium compounds are the $\pi$-bonded organochromium compounds of the structure $$(L)_x - Cr - (L')_y$$

disclosed, for example, in U.S. Pat. Nos. 3,806,500 and 3,844,975 wherein L and L' are the same or different organic ligands which are adapted to being pi-bonded to the chromium atom, and $x$ and $y$ are each integers of 0 to 3, inclusive, and $x$ plus $y$ equals 2 to 6, inclusive. Typical compounds of this group are bis(cyclopentadienyl) chromium (II), bis(benzene)chromium (O), cyclopentadienyl chromium tricarbonyl hydride, etc.

A third group of organic chromium compounds are tetravalent organochromium compounds of the structure $Y_4Cr$ disclosed, for example, in U.S. Pat. No. 3,875,132 wherein Y is individually selected from alkyl, alkenyl, cycloalkyl, cycloalkenyl, cycloalkyl-substituted alkyl, or aryl-substituted alkyl radicals containing 1 to about 14 carbon atoms and the tetravalent chromium atom is directly linked to one of the carbon atoms in each alkyl group. Typical compounds of this group are tetrakis(neopentyl)chromium(IV), tetrakis(tertiarybutyl)chromium (IV), etc.

Another type of organic chromium compound which may be used in this invention is the reaction product of ammonium chromate and pinacol as disclosed in Hoff et al U.S. Pat. No. 3,986,983 issued Oct. 19, 1976, and also assigned to the assignee hereof.

Still another group of chromium compounds which may be used in the present invention include several types of chromate esters. A simple type is organic chromate of the formula

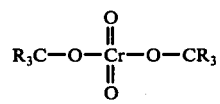

wherein R is individually selected from hydrogen or a hydrocarbyl radical containing about 1–14 carbon atoms, preferably about 3–10 carbon atoms, including alkyl, aryl, arylalkyl, cycloalkyl, alkenyl and cycloalkenyl groups. Typical compounds are bis(triphenylmethyl) chromate, bis(tributylmethyl)chromate, etc.

A second group of chromate ester is organosilyl chromate, such as described in Granchelli et al U.S. Pat. No. 2,863,891, and has the general formula

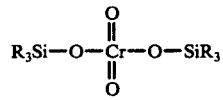

wherein R is individually selected from hydrogen and a wide range of hydrocarbyl groups similar to those just described immediately above. A typical compound is bis(triphenylsilyl)chromate.

A third type of chromate ester which may be used in this invention is chromyl bis(trihydrocarbyltitanate), such as disclosed in U. S. Pat. No. 3,752,795, and has the general formula

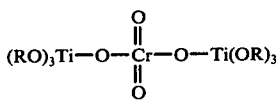

wherein R is individually selected from a wide range of hydrocarbyl radicals described immediately above. A typical compound is chromyl bis(tributyltitanate).

Still another type of chromate ester is chromyl bis(dihydrocarbylphosphate), such as disclosed in U.S. Pat. No. 3,474,080, and has the general formula

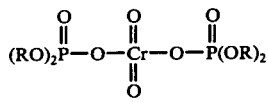

wherein R is again individually selected from a wide variety of hydrocarbyl groups described immediately above. A typical compound is chromyl bis(diphenylphosphate).

In accordance with this invention, the burning off of the carbon residue by-product from the activated catalysts gives improved catalytic performance when used for olefinic polymerization or copolymerization.

In accordance with this invention, the new catalysts are prepared and activated in the following manner:

1. The support or base

The finely divided and difficult to reduce inorganic support is preferably silica, alumina, zirconia, thoria, magnesia, titania, or mixtures or composites thereof. These supports can have a pore volume in excess of 0.5 cc/g and a surface area ranging from a few m²/g to over 700 m²/g, but preferably above 150 m²/g. A finely divided non-porous support with a high surface area such as "Cab-O-Sil" may also be used.

It is sometimes advantageous to pretreat the support before addition of the organic chromium compound. Such pretreatment typically consists of adjusting the moisture content of the support by drying at elevated temperature or chemically modifying the support with compounds containing metallic elements such as zirconium, titanium, boron, vanadium, tin, molybdenum, magnesium, hafnium, or the like. Chemical modification can include adding compounds such as ammonium hexafluorosilicate which can react with the support or with the organic chromium compound during calcining and activation. Chemical modification using metal alkyls which react with the support can also be used.

In calcining or adjusting the moisture content of the support, temperatures of from 300°-2000° F. are normally used for a time sufficient to drive off substantially all loosely held volatile material. The calcining or drying steps can be carried out by process known in the art such as in a furnace or in a heated fluizided bed using dry gases such as nitrogen, air, carbon monoxide or other suitable reactive or inert gases as the fluidizing medium.

2. Impregnating the support

The organic chromium compound can be deposited on the support prior to thermal activation in a number of ways well known in the art. These include dry mixing the support and the organic compound, dissolving the chromium compound and mixing the solution and the support, and vaporizing the compound and contacting the vapor with the support. In the case of solution impregnation, it is often convenient to remove excess solvent by drying before proceeding with thermal activation.

3. Thermal activation of the catalyst.

Up to this point, in most cases, the catalysts so prepared have little or no activity. To improve their performance, a process commonly known as activation or thermal aging is employed. In essence, this process requires subjecting the catalysts to elevated temperatures in the presence of an inert or reducing (nonoxidative) atmosphere. As demonstrated in Examples 18-24, even a minute contamination of oxygen during the activation generally has a detrimental effect on catalyst activity. Understandably, such an adverse effect is greatly magnified when the chromium level is reduced to about 0.15% from a more typical 1% by weight.

The activation step is usually carried out using a prescribed heating cycle which includes heating the catalysts up to a specific temperature, usually in the range of 600°-2000° F. (preferably 800°-2000° F.), holding the catalyst at this temperature for a prescribed length of time, usually 30 minutes to 12 hours, followed by cooling. The cycle can include hold periods at temperatures below the maximum to permit diffusion of moisture or solvents from the catalyst pores, or to permit reactions such as decomposition of the organic chromium compound to take place.

4. Treatment of the activated catalyst

The new and improved catalyst of this invention is obtained by subjecting the activated catalyst described in the preceding section to a post-treatment with dry air, oxygen, carbon dioxide, nitrous oxide and other oxidizing gases for a short period of time, preferably in a fluid bed, at elevated temperatures up to but normally below the highest temperature at which the catalyst was previously held during the non-oxidative activation. In general, this treatment results not only in a partial or complete burning off of the carbon residue which eventually leads to the improved polymer color of a polymer prepared with the catalyst but also in a substantial modification of the catalyst which reveals itself in the improved activity and significantly different and/or improved polymer properties.

As the presence of even a minute quantity of oxygen during the non-oxidative activation was known to be detrimental to the genesis of catalyst activity, or in other words oxygen is a catalyst poison, it was generally expected that any attempt to remove carbon residue by the air treatment or other oxidative methods would necessarily involve severe sacrifice of catalyst activity, possibly to the extent of completely deactivating the catalyst. It was therefore unexpected that catalyst activity was greatly improved instead and that the physical properties of the resulting polymer were also significantly modified or improved.

As a matter of practical considerations, this post-activation treatment is normally carried out by using dry air or diluted air but other less obvious and weaker oxidizing gases such as carbon dioxide and nitrous oxide may also be used, as illustrated in Examples 25-28 with excellent results of improving the polymer color. In general, a mixture of the above-mentioned oxidizing gases may be used also. Furthermore, it is permissible, or sometimes useful from an operating point of view, to dilute the oxidizing gas or mixture of oxidizing gases with an inert gas, or a mixture of inert gases, such as nitrogen, helium, argon, neon, etc., in said treatment of the activated catalyst. The temperature and duration of said treatment are, as a rule, to be adjusted in each case so as to achieve the desired effects depending on the catalyst composition, type of oxidizing gas and other catalyst preparation variables.

In the case of air treatment, the preferred temperature is 900°–1700° F. In this range of from about 900°–1700° F. a drastic improvement in polymer color and other resin properties such as lower ash, higher melt index, broader MWD, etc. is obtained. If a Hunter meter is used to measure the color of the polymer produced with catalysts which are the subject of this invention, it is found that air treated and untreated catalysts give typical values as follows:

|  | "B Value" | "L Value" |
|---|---|---|
| Polymer from untreated catalyst | 0.5–2.0 | 68–80 |
| Polymer from air treated catalyst | 0.1–1.0 | 86–91 |

Where a higher "B" value indicates a more intense yellow color in the polymer, a high "L" value indicates better whiteness.

Polymer properties do not depend on the length of time the catalyst is air treated, provided the time is long enough to eliminate the carbon residue evidenced by the characteristic black color of the untreated catalyst. It has been demonstrated experimentally that the air treatment can be as short as 20 seconds.

5. Polymerization

The new and improved catalysts prepared according to this invention may be used to polymerize 1-olefins in liquid phase or vapor phase processes. These processes may be either batch or continuous. The mode of charging catalyst, olefin, and solvent if required, to the reactor system may follow any conventional practice applicable to batch or continuous operation. Normally, agitation is provided in the reactor as well as a means to remove the heat of polymerization and a means to control the reactor temperature. In liquid phase processes, olefin polymer is normally recovered by flashing off solvent without any intervening steps for removal of the catalyst. The activity of the catalysts described in this invention is normally greater than 3000 lbs. of polymer/pound of catalyst so that catalyst removal for practical purposes is unnecessary. Reactor conditions are dependent on the type of olefin as well as the desired polymer properties. In the case of ethylene, reactor pressures may range from 50 to 1000 psig, temperatures from 150° F. to 500° F. and solids levels from 5–60% by weight.

As a result of this invention, it is now possible to achieve the following improvements with catalysts derived from supported organic chromium compounds pyrolytically activated in a non-oxidative atmosphere:

a. Improved solid polymer color when used for 1-olefin polymerization.
b. Higher melt index especially when used for ethylene polymerization.
c. Higher catalyst activity.
d. Production of ethylene polymers having broader molecular weight distribution as indicated by higher melt flow shear response.
e. Production of ethylene polymers having higher melt elasticity.

DESCRIPTION OF THE PREFERRED EMBODIMENTS

The following examples illustrate the invention:

EXAMPLE 1

A silica base having a surface area of approximately 350 $m^2/g$ and a pore volume of approximately 1.7 cc/gm was used as the catalyst support for this example.

This type of material is available commercially from such sources as the Davison Chemical Company, and their designation for this type of material is 952 MS-ID silica gel. The catalyst of this example was prepared by thoroughly mixing this silica base with an aqueous solution of zirconium tetrachloride. A sufficient amount of zirconium tetrachloride was used to give 1% zirconium on the base. The base so impregnated was dried in an oven at 400° F. until it was free flowing, at which point it was transferred to saggers and calcined in a muffle furnace at 1200° F. for 4 hours. Upon cooling, this dried silica was then dry mixed with a sufficient amount of chromium acetylacetonate to give a chromium concentration of 1% by weight on the total dry catalyst. The dried catalyst was then transferred to an activator.

The activator consisted of a 4 inches I.D. by about 48 inches long tube made of "Inconel" metal. The tube was provided with electric heaters around the outside of the tube. The heaters were capable of heating the tube plus its contents to temperatures of up to 2000° F. The bottom of the tube was fitted with a distributor plate designed to give uniform distribution of the gas entering the bottom of the tube and flowing up through the tube. A bed of regenerated molecular sieves was used to dry the nitrogen to a total moisture content of less than 2 ppm (vol.) before it entered the tube. Before entering the desiccant bed, the nitrogen was passed through a deoxygenating bed containing a reduced copper oxide catalyst. In this bed, the oxygen level was reduced to less than 5 ppm (vol.). A flow measuring device to regulate the flow rate of gas through the activator tube was provided. A controller for the heating elements capable of raising the temperature of the fluidizing tube to elevated temperatues according to a predetermined cycle was also provided.

In this tube, the catalyst was fluidized with nitrogen and heated to a temperature of 350° F. and held for 3 hours; the temperature was then raised to 550° F. and held for 3 hours; and the temperature was then raised to 1700° F. and held for 6 hours. The heat up rate between hold temperature was about 150° F./hr. All the while the nitrogen flow was held constant to provide fluidization of the catalyst within the heated tube. The catalyst was then cooled to approximately ambient temperature while still fluidized and was then dumped from the tube into a predried flask which had been carefully purged to eliminate all traces of oxygen and moisture from the interior of the flask. This flask was then sealed, and the flask was stored in a container having a dry nitrogen environment until the catalyst was to be used in the polymerization process. The activated catalyst of this example was black in color. At a suitable time, the catalyst was charged to a continuous polymerization reactor and used to polymerize ethylene at a temperature of about 227° F. in the presence of dry isobutane and with an ethylene concentration of about 5% by weight in the reactor.

The reactor used for the polymerization tests consisted of a vessel provided with a jacket and a means for good agitation within the vessel. The volume of the vessel was about 90 gallons. Water was circulated through the jacket of the reactor to remove the heat liberated during the polymerization reaction. Means were provided to regulate the coolant temperature and the coolant flow so as to control the temperature of the reactor. Means were provided to feed a slurry of catalyst to the reactor at a controlled rate. Means were also provided to feed ethylene to the reactor at a controlled rate. Means were also provided for introducing a second monomer or comonomer to the reactor as well as modifying agents to control the molecular weight of the polymer formed in the reactor although these were not used in this example. Means were provided to feed a diluent separately to the reactor at a controlled rate. Means were provided to discharge a mixture of the polymer formed in the reactor, unreacted monomer and/or comonomer, and diluent from the reactor. The polymer mixture discharged from the reactor flowed to a heated flash vessel where the diluent and unreacted ethylene were removed as a vapor and the polymer was recovered with only traces of hydrocarbon. The recovered polymer was purged batchwise with inert gas to remove the traces of hydrocarbon and analysed for melt index, density and ash. These factors are determined by standard tests well known in the industry. The test use for determining melt index is ASTM D-1238, and the method for measuring the density is ASTM D-1505. Ash was determined by a pyrolysis method. In all cases, the polymer yield figures are calculated from the ash values.

This example illustrated the performance of a typical nontreated chromium acetylacetonate catalyst. The polymer yield of this catalyst amounts to 2,730 pounds of polymer collected per pound of catalyst fed to the reactor. The Hunter color evaluation indicated a whiteness value of 76.7. Other pertinent data are summarized in Table I.

EXAMPLES 2-5

The catalysts used in these examples were prepared in the same manner as in Example 1 except that air was introduced into the catalyst bed during the cool down period after catalyst activation, at various temperatures as specified in Table I (1100°–1550° F.), for a period of fifteen minutes. After the air treatment the normal nitrogen flow was restored in the activator and the catalyst was allowed to cool down to room temperature.

These catalysts were then tested in the continuous polymerization reactor of Example 1. The results are summarized in Table I.

These examples clearly demonstrated the beneficial effects obtained by this invention. An improved MI/synthesis temperature relationship along with higher Rd (broader molecular weight distribution), improved catalyst activity (lower ash), and significantly higher Hunter whiteness (L) are realized.

EXAMPLES 6 and 7

These examples illustrate the invention with a catalyst system involving the reaction product of ammonium chromate and pinacol.

Untreated catalyst:

Davison 952 base was impregnated with an aqueous solution of ammonium chromate and pinacol having a molar ratio of pinacol/ammonium chromate of 4. A sufficient amount of ammonium chromate was used to give a concentration of 0.8% chromium by weight on the base. The impregnation was done in a round bottomed flask under constant nitrogen purge. The flask containing the impregnated base and still under nitrogen purge was then heated with a heat gun to remove the excessive moisture.

The dried catalyst was carefully transferred under nitrogen atmosphere to the activator tube of Example 1. A mixture of nitrogen and carbon monoxide (7 vol.% carbon monoxide and 93 vol.% nitrogen) was used to fluidize the catalyst and the tube was heated to 1300° F. at approximixately 200° F./hour heat up rate and held at 1300° F. for five hours. After cooling down to 450° F. pure nitrogen was used to purge the tube. After four hours of nitrogen purge the catalyst was then transferred to a well purged catalyst flask.

Treated catalyst:

Basically the air treated catalyst was prepared in a very similar fashion as the one described above except for the fluidizing gas after the 1300° F. hold period. In this case, air was introduced for 15 minutes at the start of the cool down period after the non-oxidative activation. At the end of fifteen minutes, pure nitrogen replaced the air and the tube continued to cool. When it reached 750° F. carbon monoxide replaced the nitrogen for fifteen minutes. After an additional nitrogen purge for four hours, the catalyst was removed and stored in a flask.

When tested in the continuous reactor of Example 1, these two catalysts showed the advantages of this invention. The air treated catalyst demonstrated significantly improved catalyst activity and polymer color as summarized in Table I.

EXAMPLES 8 and 9

These examples illustrate the applicability of this invention to silica supported catalyst involving $\pi$-bonded chromium compounds such as described in U.S. Pat. 3,806,500, an example of which is dicyclopentadienyl chromium (Chromoncene).

In Example 8, in accordance with the general procedure as disclosed in U.S. Pat. No. 3,806,500, the base catalyst activated but not treated was prepared as follows:

1. 50 grams of Davison 952 MS-ID silica gel was dehydrated in a 38 mm O.D. 27 inches long "Vycor" tube surrounded with a tubular electric heater and under a nitrogen fluidizing atmosphere. A fritted disc was provided in the midsection of the tube for the purpose of fluidizing the catalyst. The dehydration temperature was 1100° F. and lasted for two hours. After cooling to ambient temperature, the dry silica gel was transferred to a well purged flask.

2. 2 grams of Chromocene dissolved in 120 cc toluene was added to 40 grams of the dried silica base of step 1. The excess solvent was evaporated at ambient temperature by nitrogen sweep.

3. About 15 grams of this catalyst was then charged to the "Vycor" tube and the catalyst was activated under 400 cc/min. of nitrogen flow by a heating cycle as follows: (a) hold at 250° F. for one hour; (b) hold at 350° F. for one hour; (c) hold at 550° F. for one hour; (d) hold at 1600° F. for 2 hours via 200° F./15 minutes heat up rate; and (e) cool down to ambient temperature.

4. The activated catalyst was transferred into a closed flask equipped with a hose and clamp at both openings without exposing to air.

In Example 9, in accordance with this invention, a new and improved Chromoncene catalyst was prepared in an almost identical manner except for the additional air treatment on the cool down portion of the activation cycle. As stated in (3) above, the catalyst was allowed to cool down after being held at 1600° F. for two hours. When it reached 1200° F., the heater was turned on and the tube temperature was maintained at 1200° F. while the catalyst was treated with air for five minutes. The catalyst was then purged with nitrogen and allowed to cool to ambient temperature.

The ethylene polymerization acitivty of these two catalysts was tested in a bench scale reactor using isobutane as the reaction medium. The reactor, essentially an autoclave 5 inches I.D. and about 12 inches deep, was equipped with an agitator rotating at 560 rpm, a flush bottom valve, and three ports for charging catalyst, isobutane and ethylene, respectively. The reactor temperature was controlled by a jacket containing methanol which was kept boiling by an electrical heater encircling the jacket. The control mechanism involved the automatic adjustment of jacket pressures in response to either cooling or heating requirements.

The reactor was first thoroughly purged with ethylene at temperatures around 200° F. followed by the transfer of a nominal 0.16 gram catalyst from the catalyst flask under nitrogen into the reactor via a transfer tube without exposing it to air. After the catalyst charge port was closed, 2900 ml of isobutane (dried and deoxygenated) was charged into the reactor, trapped ethylene was vented, and the reactor was allowed to warm up to 225° F. The reactor was then pressurized with ethylene which was regulated at 550 psig and which was permitted to flow into the reactor whenever the reactor pressure dropped below 550 psig. An instantaneous flow rate of ethylene was monitored by rotameters of various capacity. The duration of the test run was 60 minutes.

At the end of this test run, ethylene flow was cut off, the flush bottom valve was opened, and the reactor content was dumped into a recovery pot, approximately 5 inches I.D. and 10 inches deep, where isobutane was allowed to flash off through a 200 mesh screen into the vent. Polymer particles left in the pot were recovered and weighed.

As shown in Table I, there was a substantial increase in yield (gm/polymer/gm catalyst/hr) as well as polymer whiteness (L value) with the treated catalyst.

EXAMPLES 10 and 11

These examples further illustrate the benefits realized under this invention with another catalytic system involving one type of chromate esters, namely silyl chromates, an example of which is bis(triphenylsilyl)chromate.

The control sample under this set of examples was prepared by dissolving 2.5 grams of bis(triphenylsilyl)chromate in sixty cubic centimeters of toluene and impregnating with this solution, twenty grams of Davison 952 MS-ID silica base predried at 1300° F. After being thoroughly purged and dried, a portion of this free-flowing, chromate impregnated silica was charged to a Vycor tube and thermally treated according to the method of Example 8 (without air treatment).

The new and improved catalyst under this invention was prepared in a similar manner except for the additional air treatment during the cool down period after the non-oxidative activation. Air treatment procedure and temperatures identical to those given in Example 9 was used.

Polymerization tests with the control catalyst and the catalyst of this invention were conducted in a bench scale reactor as described in Examples 8 and 9. The resultant data summarized in Table I demonstrate again the significant improvement in polymer color and catalytic activity with the improved catalyst of this invention.

TABLE I

| | | | Summary of Examples 1 through 11 | | | | | | |
|---|---|---|---|---|---|---|---|---|---|
| Example No. | Catalyst Composition | Act. Temp. | Air Treatment | Reaction Temp. ° F. | MI | Rd/Sw[(1)] | Yield #/#Cat. | Ash % | Color (L)* |
| 1 | 1% Cr/1% Zr as ZrCl$_4$ | 1700° F. | None | 227.0 | 0.58 | 5.7/5.0 | 2730 | .038 | 76.7 |
| 2 | " | 1700° F. | 1100° F. | 227.0 | 1.80 | 7.8/4.3 | 8340 | .012 | 90.0 |
| 3 | " | 1700° F. | 1200° F. | 220.0 | 0.90 | 7.5/4.6 | 7700 | .013 | 89.7 |
| 4 | " | 1700° F. | 1300 20 F. | 226.5 | 1.90 | 7.6/4.6 | 5260 | .019 | 90.1 |
| 5 | " | 1700° F. | 1550° F. | 225.0 | 0.70 | 7.5/4.5 | 5260 | .019 | 88.2 |
| 6 | 0.8% Cr as Pinacol/NH$_4$Cro$_4$ | 1300° F. | None | 228.0 | 0.06 | | | .180 | 79.2 |
| 7 | " | 1300° F. | 1300° F. | 227.5 | 0.16 | | | .013 | 89.4 |
| 8 | 1.45% Cr as Chromocene | 1600° F. | None | 225.0 | 0.24 | NA | 300** | | 37.9 |
| 9 | " | 1600° F. | 1200° F. | 225.0 | 0.42 | NA | 1175** | | 86.6 |
| 10 | 1% Cr as bis(triphenylsilyl)chromate | 1600° F. | None | 225.0 | | | 214** | | 68.5 |
| 11 | " | 1600° F. | 1200° F. | 225.0 | | | 623** | | 92.5 |

*Hunter color whiteness value. Test method from Hunter Laboratory Assoc.
**Reactivity in gms. polymer per gms. catalyst per hour.
[(1)]Shear sensitivity index (Prediction of High Density Polyethylene Processing Behavior from Rheological Measurements by M. Shida and L. Cancio)

EXAMPLES 12 and 13

These examples further illustrate the practical benefits of this invention with a silica-supported catalyst involving another type of chromate ester which is represented by bis(triphenylmethyl)chromate.

The base catalyst used in these examples was prepared by impregnating 20 grams of Davison 952 MS-ID silica, predried at 1300° F. for 5 hours, with 60 ml of toluene solution containing 2.4 grams of bis(triphenylmethyl)chromate, followed by evaporating off solvent. The chromate was prepared essentially by a method described in U.S. Pat. No. 3,493,554 which comprises refluxing a mixture of 2.3 grams chromium trioxide, 6.0 grams triphenylcarbinol and 90 ml dichloromethane for 1 hour in a flask, filtering off an excess chromium trioxide and further purifying the resultant chromate ester by precipitation.

The base catalyst was then activated in nitrogen in one case according to the method of Example 8 and in the other case activated and further treated with air according to the method of Example 9. Both catalysts were tested for ethylene polymerization in a bench scale reactor in accordance with the procedure described in Examples 8 and 9.

For a charge of 0.1845g of the untreated catalyst and run time of 1 hour, we recovered 22 grams of polymer, corresponding to the reactivity of 119g polymer/g catalyst/hr. For the treated catalyst, we charged 0.0762g catalyst, recovered 19 grams polymer in 1 hour and obtained the improved reactivity of 249 g/g catalyst/hr. Again, the polymer color was very much improved by said treatment.

EXAMPLES 14 AND 15

These examples are intended to illustrate the applicability of the present invention to a silica-supported catalyst involving still another type of chromate ester, namely chromyl bis(trihydrocarbyltitanate), an example of which is chromyl bis(tributyltitanate).

The base catalyst used in these examples is prepared by impregnating Davison 952 MS-ID silica, predried at 1300° F. for 4 hours in the muffle furnace, with carbon tetrachloride solution containing chromyl bis(tributyltitanate), which was prepared essentially by a method disclosed in U.S. Pat. No. 3,752,795, which comprises refluxing a mixture of 10 grams chromium trioxide, 18 ml tetrabutyltitanate and 250 ml carbon tetrachloride for 24 hours in an inert atmosphere, cooling the green reaction mixture, filtering off the unreacted chromium oxide, and recovering the remaining solution containing said chromate ester. The solution is then concentrated to give the chromium content of about 0.4g chromium per 100 ml so that the base catalyst may be prepared conveniently by impregnation to contain about 1% chromium by weight on the dry basis.

The impregnated base catalyst is then activated by the method of Example 8 in one case and is activated and further treated with air in another case by the method of Example 9. Both catalysts are subsequently tested for ethylene polymerization in a bench scale reactor according to the procedure described in Examples 8 and 9. The polymer yields are 432 and 207 g/g catalyst/hr for the treated and untreated catalyst, respectively. The polymer color is again noticeably improved by said treatment of the activated catalyst.

EXAMPLES 16 AND 17

These examples are intended to further demonstrate the broad applicability of the present invention to various types of organic chromium compounds. A catalyst used in these examples involves another distinctive class of organochromium compounds featuring tetravalent chromium and typified by tetrakis (neopentyl) chromium(IV).

Tetrakis(neopentyl)chromium is prepared essentially by a method disclosed in U.S. Pat. No. 3,875,132. The base catalyst is prepared by dispersing tetrakis(neopentyl)chromium in heptane solution onto Davison 952 MS-ID silica, predried at 1300° F. for 5 hours in a fluid bed, in such a ratio as to give 1% chromium by weight on the dry basis in the impregnated catalyst. The base catalyst thus prepared is activated, in one case, by the method of Example 8 and, in the other case, by the method of Example 9 which includes further treatment of the activated catalyst at 1200° F. for a period of 15 minutes with dry air.

The catalyst thus prepared are individually tested in a bench scale reactor according to the procedure described in Examples 8 and 9. In both cases, the duration of test run is 60 minutes. The reactivities indicated are 574 and 342g polymer/g catalyst/hour for the treated and untreated cases, respectively. The polymer color turns out to be gray for the untreated catalyst but looks quite white to the naked eye in the treated case.

EXAMPLES 18-24

These examples are intended to illustrate the detrimental effect of oxygen contamination during activation on catalyst reactivity. The zirconium modified 952 base used for these examples was prepared in the same fashion as the one described in Example 1. The zirconated base was then impregnated with chromium acetylacetonate dissolved in toluene. After drying in an inert atmosphere until it is free flowing, the $Cr(AcAc)_3$ impregnated base was charged to the Vycor tube of Examples 8 and 9 and thermally treated as follows:

1. 400 cc/minute dry nitrogen doped with a predetermined amount of oxygen was used to fluidize the catalyst.
2. The heating cycle used was (a) hold at 250° F. for one hour, (b) hold at 350° F. for one hour, (c) hold at 550° F. for one hour, (d) hold at 1700° F. for 2 hours via 200° F./15 minutes heat up rate, (e) cool down to ambient temperature.
3. The activated catalyst was transferred into a closed flask equipped with a hose and clamp at both openings without exposing to air.

Polymerization tests with ethylene were carried out in the bench scale reactor of Examples 8 and 9. As shown in Table II below a loss in catalyst reactivity was noted when oxygen impurity was present during activation and the loss increases as oxygen impurities increase.

TABLE II

Effect of Trace Amounts of $O_2$ in $N_2$
Activation Temperature = 1700° F.
Synthesis Temperature = 225° F.

| Example No. | Catalyst Composition | PPM $O_2$ in $N_2$ | Reactivity g/g/hr |
|---|---|---|---|
| 18 | 0.15% Cr/0.5% Zr | 0 | 400 |
| 19 | 0.15% Cr/0.5% Zr | 160 | 0 |
| 20 | 0.3% Cr/1% Zr | 0 | 500 |
| 21 | 0.3% Cr/1% Zr | 57 | 125 |
| 22 | 0.75% Cr/1% Zr | 0 | 1200 |
| 23 | 0.75% Cr/1% Zr | 57 | 325 |
| 24 | 0.75% Cr/1% Zr | 160 | 100 |

EXAMPLES 25-28

These illustrative examples are to demonstrate the beneficial effects of this invention using oxidizing gases other than air. The polymer color is distinctively improved as indicated by the following examples:

Carbon Dioxide

Catalysts of these examples were prepared in a very similar fashion as those in Examples 2-5 except that carbon dioxide was used instead of air. Carbon dioxide treatment time was one hour. Catalysts so treated were evaluated in the continuous loop reactor of Example 1. The following results were obtained:

| Example No. | Catalyst Composition | Carbon Dioxide Treatment Temperature | Yield #/#Cat. | Color (L) |
| --- | --- | --- | --- | --- |
| 25 | 1% Cr/1% Zr as ZrCl$_4$ | 1600° F. | 2630 | 88.2 |
| 26 | 1% Cr/1% Zr as ZrCl$_4$ | 1300° F. | 4160 | 82.6 |
| 27 | 1% Cr/1% Zr as ZrCl$_4$ | 1000° F. | 2560 | 80.4 |

NITROUS OXIDE

The catalyst of this example was prepared similarly as in Examples 18–24 except that oxygen-free nitrogen gas was used to fluidize the catalyst during the activation and a nitrous oxide treatment lasting 60 minutes was conducted during cool down after the activation. The catalyst of this example was tested in the bench scale reactor of Examples 8 and 9. The following results were obtained:

| Example No. | Catalyst Composition | Nitrous Oxide Treatment Temperature | Yield g/g Cat. | Color (L) |
| --- | --- | --- | --- | --- |
| 28 | 1% Cr/1% Zr as ZrCl$_4$ | 1200° F. | 1747 | 90.0 |

Having described our invention as related to the embodiments disclosed herein, it is our intention that the invention be not limited by any of the details of description, unless otherwise specified, but rather be construed broadly within its spirit and scope as set out in the appended claims.

We claim:

1. The method of preparing a polyolefin catalyst, comprising: preparing a mixture by dispersing on a finely divided, difficult to reduce, inorganic support of the class consisting of silica, alumina, thoria, zirconia, titania, magnesia and mixtures and composites thereof an organic chromium compound pyrolytically decomposable in the substantial absence of oxygen to deposit a catalyst residue including as a contaminant a carbon residue on said support; activating said mixture by subjecting the mixture to non-oxidative pyrolysis to and at an activating temperature within the range of about 600°–2000° F., thereby depositing on said support a catalytically active residue for the polymerizing of 1-olefins of 2–8 carbon atoms and copolymerizing said olefins with 1-olefins of 2–20 carbon atoms, said residue including a black carbon deposit residue; and substantially removing said black carbon deposit by burning in an oxidizing gas at an elevated temperature for a short period of time sufficient to burn off said black carbon deposit residue, thereby simultaneously modifying and improving the characteristics of the resulting activated catalyst.

2. The method of claim 1 wherein said support prior to the dispersing thereon of said organic chromium compound is calcined at an elevated temperature until substantially all volatile matter is driven off.

3. The method of claim 2 wherein said calcining is done in a dry, inert atmosphere at an elevated temperature of about 300°–2000° F.

4. The method of claim 1 wherein said mixture is prepared by dissolving said organic chromium compound in a solvent and impregnating said support with the resulting solution followed by drying.

5. The method of claim 1 wherein said dispersing is accomplished by dry blending the organic chromium compound with the support and said activating is accomplished by heating in a fluid bed maintained in suspension with a non-oxidizing gas.

6. The method of claim 1 wherein said dispersing is accomplished by vaporizing and adsorbing said organic chromium compound onto the support.

7. The method of claim 1 wherein said activating is in a fluid bed using a non-oxidizing gas to maintain the mixture of support and organic chromium compound in a fluid condition.

8. The method of claim 1 wherein said organic chromium compound comprises a chromium chelate of a beta-dicarbonyl compound essentially of the formula of the class consisting of

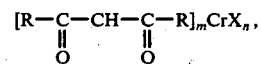

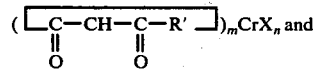

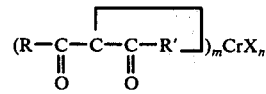

wherein each R is individually selected from hydrogen, alkyl, alkenyl, aryl, cycloalkyl and cycloalkenyl radicals and combinations of these radicals with each R containing 0–20 carbon atoms and a corresponding valence-satisfying number of hydrogen atoms, R' is selected from alkylene, alkenylene, arylene, cycloalkylene and cycloalkenylene radicals and combinations of these bivalent radicals with R' containing 1–20 carbon atoms and a corresponding valence-satisfying number of hydrogen atoms, $m$ is a whole number from 1 to 3, $n$ is a whole number from 0 to 2 with $m$ plus $n$ being a whole number from 2 to 3 and X is an inorganic or organic negative group relative to chromium, and said activating is accomplished by heating to and at an elevated temperature of from about 800°–2000° F. in a non-oxidizing atmosphere.

9. The method of claim 1 wherein said organic chromium compound comprises a $\pi$-bonded chromium compound essentially of the structure

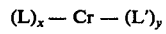

wherein L and L' are the same or different organic ligands which are adapted to being pi-bonded to the chromium atom, and $x$ and $y$ are each integers of 0 to 3 inclusive, and $x$ plus $y$ equals 2 to 6, inclusive.

10. The method of claim 1 wherein said organic chromium compound comprises a tetravalent organochromium compound essentially of the structure $Y_4Cr$ wherein Y is selected individually from alkyl, alkenyl, cycloalkyl, cycloalkenyl, cycloalkyl-substituted alkyl, and aryl-substituted alkyl radicals containing 1 to about 14 carbon atoms and the tetravalent chromium atom is directly bonded to one of the carbon atoms in each Y.

11. The method of claim 1 wherein said organic chromium compound comprises the reaction product of ammonium chromate and pinacol.

12. The method of claim 1 wherein said organic chromium compound comprises a bis(trihydrocarbylsilyl)chromate essentially of the formula

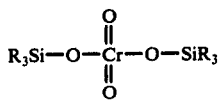

wherein R is hydrogen or a hydrocarbyl group containing from 1 to about 14 carbon atoms.

13. The method of claim 1 wherein said organic chromium comprises a bis(trihydrocarbylmethyl)chromate essentially of the formula

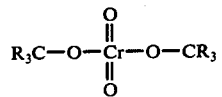

wherein R is hydrogen or a hydrocarbyl radical containing 1 to about 14 carbon atoms.

14. The method of claim 1 wherein said organic chromium compound comprises a chromyl bis(trihydrocarbyltitanate) essentially of the formula

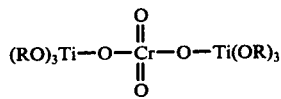

wherein R is individually selected from alkyl, arylalkyl, cycloalkyl, alkenyl and cycloalkenyl radicals containing from 1 to about 14 carbon atoms.

15. A catalyst, prepared by the method comprising: preparing a mixture by dispersing on a finely divided, difficult to reduce, inorganic support of the class consisting of silica, alumina, thoria, zirconia, titania, magnesia, and mixtures and composites thereof an organic chromium compound pyrolytically decomposable in the substantial absence of oxygen to deposit a catalyst residue including as a contaminant a carbon residue on said support; activating said mixture by subjecting the mixture to non-oxidative pyrolysis to and at an activating temperature within the range of about 600°–2000° F., thereby depositing on said support a catalytically active residue for the polymerizing of 1-olefins of 2–8 carbon atoms and copolymerizing said olefins with 1-olefins of 2–20 carbon atoms, said residue including a black carbon deposit residue; and substantially removing said black carbon deposit by burning in an oxidizing gas at an elevated temperature for a short period of time sufficient to burn off said black carbon deposit residue, thereby simultaneously modifying and improving the characteristics of the activated catalyst.

16. The catalyst of claim 15 wherein said support prior to the dispersing thereon of said organic chromium compound is calcined at an elevated temperature until substantially all volatile matter is driven off.

17. The catalyst of claim 16 wherein said calcining is done in a dry, inert atmosphere at an elevated temperature of about 300°–2000° F.

18. The catalyst of claim 15 wherein said mixture is prepared by dissolving said organic chromium compound in a solvent and impregnating said support with the resulting solution followed by drying.

19. The catalyst of claim 15 wherein said dispersing is accomplished by dry blending the organic chromium compound with the support and said activating is accomplished by heating in a fluid bed maintained in suspension with a non-oxidizing gas.

20. The catalyst of claim 15 wherein said dispersing is accomplished by vaporizing and adsorbing said organic chromium compound onto the support.

21. The catalyst of claim 15 wherein said activating is a fluid bed using a non-oxidizing gas to maintain the mixture of support and organic chromium compound is a fluid condition.

22. The catalyst of claim 15 wherein said organic chromium compound comprises a chromium chelate of a beta-dicarbonyl compound essentially of the formula of the class consisting of

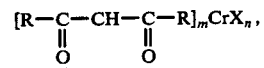

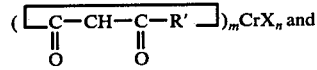

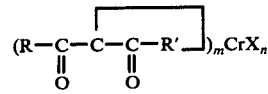

wherein each R is individually selected from hydrogen, alkyl, alkenyl, aryl, cycloalkyl and cycloalkenyl radicals and combinations of these radicals with each R containing 0–20 carbon atoms and a corresponding valence-satisfying number of hydrogen atoms, R' is selected from alkylene, alkenylene, arylene, cycloalkylene and cycloalkenylene radicals and combinations of these bivalent radicals with R' containing 1–20 carbon atoms and a corresponding valence-satisfying number of hydrogen atoms, m is a whole number from 1 to 3, n is a whole number from 0 to 2 with m plus n being a whole number of 2 to 3 and X is an inorganic or organic negative group relative to chromium, and said activating is accomplished by heating to and at an elevated temperature of from about 800°–2000° F. in a non-oxidizing atmosphere.

23. The catalyst of claim 15 wherein said organic chromium compound comprises a π-bonded chromium compound essentially of the structure

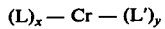

wherein L and L' are the same or different organic ligands which are adapted to being pi-bonded to the chromium atom, and x and y are each integers of 0 to 3 inclusive, and x plus y equals 2 to 6, inclusive.

24. The catalyst of claim 15 wherein said organic chromium compound comprises a tetravalent organochromium compound essentially of the structure Y₄Cr wherein Y is selected individually from alkyl, alkenyl, cycloalkyl, cycloalkenyl, cycloalkyl-substituted alkyl, and aryl-substituted alkyl radicals containing 1 to about 14 carbon atoms and the tetravalent chromium atom is directly bonded to one of the carbon atoms in each Y.

25. The catalyst of claim 15 wherein said organic chromium compound comprises the reaction product of ammonium chromate and pinacol.

26. The catalyst of claim 15 wherein said organic chromium compound comprises a bis(trihydrocarbylsilyl) chromate essentially of the formula

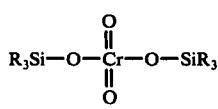

wherein R is hydrogen or a hydrocarbyl group containing from 1 to about 14 carbon atoms.

27. The catalyst of claim 15 wherein said organic chromium compound comprises a bis(trihydrocarbylmethyl)chromate essentially of the formula

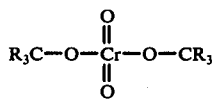

wherein R is hydrogen or a hydrocarbyl group containing from 1 to about 14 carbon atoms.

28. The catalyst of claim 15 wherein said organic chromium compound comprises a chromyl bis(trihydrocarbyltitanate) essentially of the formula

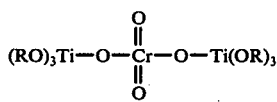

wherein R is individually selected from alkyl, arylalkyl, cycloalkyl, alkenyl, and cycloalkenyl radicals containing from 1 to about 14 carbon atoms.

29. The method of claim 8 wherein said chromium chelate comprises chromium acetylacetonate.

30. The catalyst of claim 22 wherein said chromium chelate comprises chromium acetylacetonate.

31. The method of claim 9 wherein said $\pi$-bonded chromium compound comprises bis(cyclopentadienyl)-chromium (II).

32. The catalyst of claim 23 wherein said $\pi$-bonded chromium compound comprises bis(cyclopentadienyl)-chromium(II).

33. The method of claim 12 wherein said bis(trihydrocarbylsilyl) chromate comprises bis(triphenylsilyl)-chromate.

34. The catalyst of claim 26 wherein said bis(trihydrocarbylsilyl) chromate comprises bis(triphenylsilyl)-chromate.

35. The method of claim 1 wherein said burning off of carbon residue is accomplished by using a gas that is either dry air, oxygen, carbon dioxide, nitrous oxide, or a mixture thereof.

36. The method of claim 35 wherein said gas is diluted with an inert gas of the nature of nitrogen, helium, argon, neon or mixtures of these.

37. The catalyst of claim 15 wherein said burning off of carbon residue is accomplished by using a gas that is either dry air, oxygen, carbon dioxide, nitrous oxide, or a mixture thereof.

38. The catalyst of claim 37 wherein said gas is diluted with an inert gas of the nature of nitrogen, helium, argon, neon or mixtures of these.

39. The method of claim 1 wherein said burning is at a temperature of about 900°–1700° F. in air.

40. The catalyst of claim 15 wherein said burning is at a temperature of about 900°–1700° F. in air.

* * * * *